United States Patent [19]

Diekman

[11] Patent Number: 4,680,849

[45] Date of Patent: Jul. 21, 1987

[54] APPARATUS FOR ASSEMBLING A BICYCLE FRAME

[75] Inventor: Robert L. Diekman, Dayton, Ohio

[73] Assignee: Huffy Corporation, Dayton, Ohio

[21] Appl. No.: 770,801

[22] Filed: Aug. 29, 1985

[51] Int. Cl.⁴ .............................................. B23P 19/02
[52] U.S. Cl. ........................................ 29/252; 269/45
[58] Field of Search .................... 29/252, 271; 269/45, 269/37

[56] References Cited

U.S. PATENT DOCUMENTS

| | | | |
|---|---|---|---|
| 1,501,129 | 7/1924 | Meiselbach | 269/45 X |
| 2,542,538 | 2/1951 | Kraeft | 29/252 |

FOREIGN PATENT DOCUMENTS

| | | | |
|---|---|---|---|
| 52862 | 12/1935 | Denmark | 29/267 |
| 3242270 | 5/1983 | Fed. Rep. of Germany . | |
| 678894 | 4/1930 | France | 29/271 |
| 729842 | 8/1932 | France | 269/45 |
| 889183 | 1/1944 | France | 269/45 |
| 400083 | 11/1942 | Italy . | |
| 410266 | 4/1945 | Italy | 29/252 |
| 12616 | of 1897 | United Kingdom | 269/45 |

OTHER PUBLICATIONS

Spezialmaschinen Catalog (no publication date).

Primary Examiner—Frederick R. Schmidt
Assistant Examiner—Steven P. Schad
Attorney, Agent, or Firm—Biebel, French & Nauman

[57] ABSTRACT

An apparatus for assembling a bicycle frame of the type in which the head tube, bottom bracket and seat post bracket include stubs for receiving connecting tubes in a press fit. The apparatus includes a base, a clamp for receiving the bottom bracket, a carriage for receiving the head tube, and a swing arm which pivots about the axis of the bottom bracket clamp and receives the seat post bracket and seat mast of the bicycle frame. Double-acting cylinder motors are mounted on the base for displacing the carriage toward the bottom bracket clamp and for pivoting the swing arm toward the carriage. Other cylinder motors are mounted on the carriage and are actuated to secure the head tube, and a cylinder motor is mounted on the swing arm to urge the seat bracket toward the bottom bracket. A computer control selectively actuates the cylinders to urge the bottom bracket, seat post bracket, and head tube toward each other in a substantially continuous motion, thereby urging their respective stubs into the ends of the connecting tubes to form the bicycle frame.

11 Claims, 19 Drawing Figures

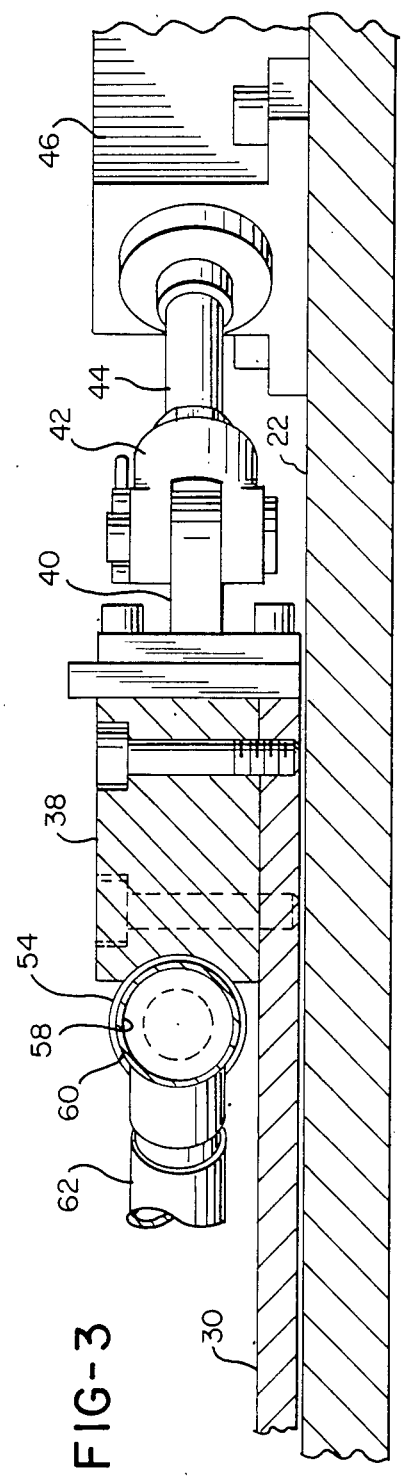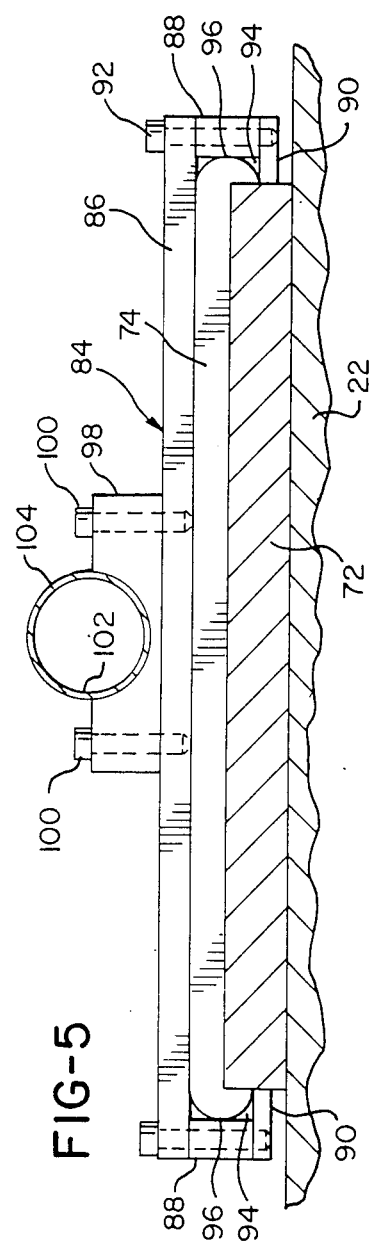

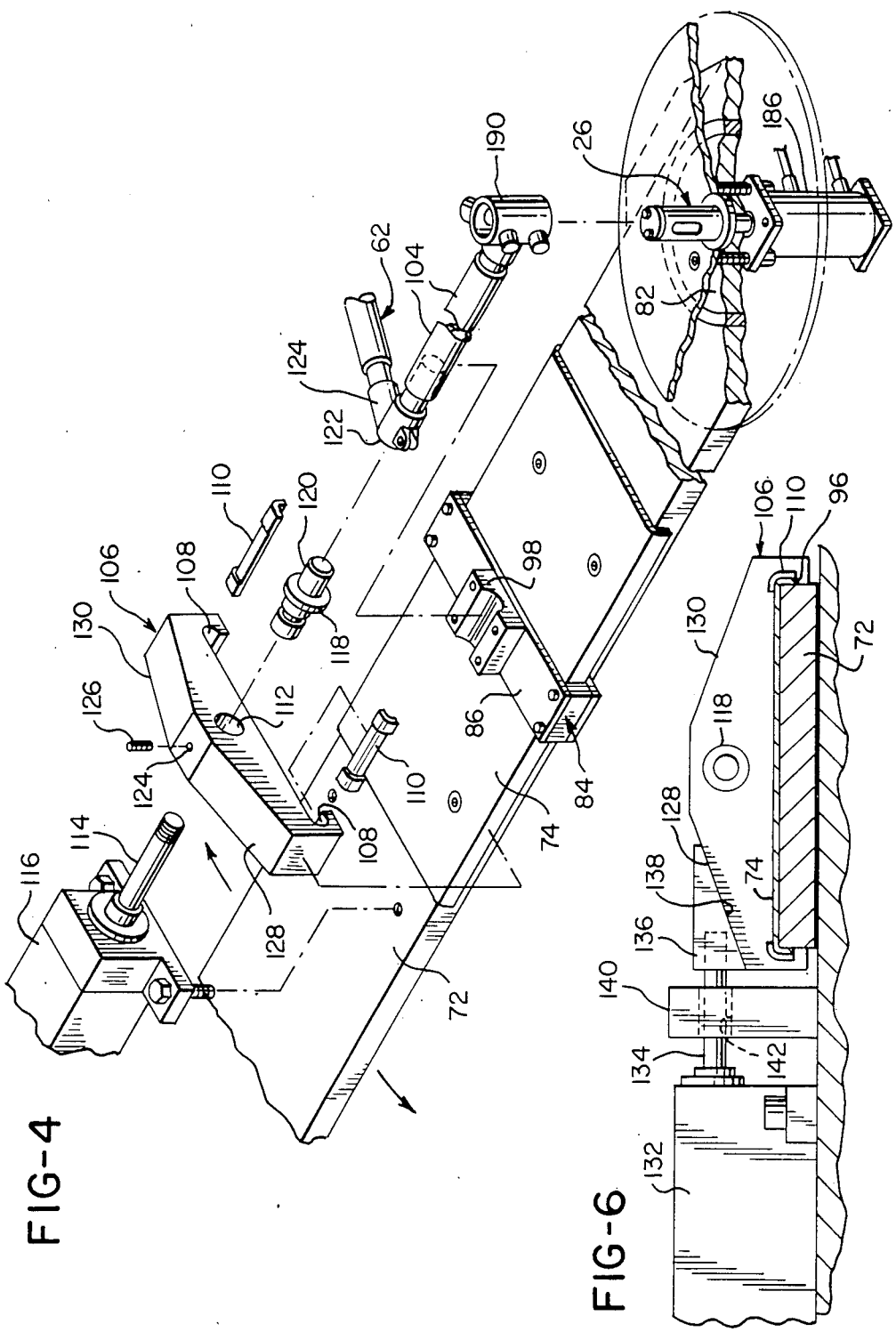

APPARATUS FOR ASSEMBLING A BICYCLE FRAME

BACKGROUND OF THE INVENTION

The present invention relates to apparatuses for assembling bicycle frames and, more particularly, apparatuses for assembling bicycle frames having tubular components which are press fitted together.

The typical lightweight bicycle frame comprises a head tube for supporting the handlebars and front fork, a seat post bracket for supporting the bicycle seat, and a bottom bracket which supports the crank assembly and chain stays which, in turn, support the rear wheel. The head tube is connected to the seat post bracket by a cylindrical top tube, and the bottom bracket is connected to the head tube and seat post bracket by a down tube and seat mast, respectively. The resulting structure is substantially triangular in shape and provides a rigid assembly.

Typically, the aforementioned components were connected to each other by welding or brazing, since that type of connection provided the requisite rigidity and strength. However, some frames currently are being constructed in which adhesives are used to connect the components, and in which components not susceptible to brazing are used. Furthermore, brazing the components of a frame together is a time-consuming, and therefore expensive, method of frame assembly.

In one type of frame construction, the head tube, bottom bracket, and seat post bracket each include cylindrical lugs which are sized to telescope within the ends of the connecting tubes to form an interference fit. The lugs are first coated with an adhesive, which is preferably a thermalsetting adhesive, and the head tube, bottom bracket, and seat post bracket are urged toward each other to drive their respective lugs into the ends of the connecting tubes. An example of such a bicycle frame construction is shown and described in detail in U.S. application Ser. No. 677,707, filed Dec. 4, 1984, now U.S. Pat. No. 4,583,755 and assigned to the assignee of the present invention.

It is desirable to size the lugs and tubes of such frames to provide a secure interference fit so that, once assembled, the frame may be stored or transported to a furnace to effect the setting up of the adhesive without the frame components moving out of alignment with each other. Consequently, the forces required to achieve such an interference fit to assemble such frame necessitate the use of power-assisted machinery. However, there do not presently exist machines which are specifically designed for the assembly of such bicycle frames. In order to assemble such frames, other types of jigs or fixtures are adapted to receive a portion of the frame to be constructed. Such fixtures include components for clamping the brackets and head tube, and also include hydraulic cylinder motors for urging the clamping devices together, thereby driving the lugs into the ends of the tube.

A disadvantage with such types of machines is that the assembly of a frame is accomplished iteratively rather than in a continuous process. Since the angular relationships between the connecting tube change as the lugs of the brackets and head tube are forced into the tube ends, the lugs must be forced in incrementally in a series of steps in which the lugs of the seat post bracket, head tube, and bottom bracket are sequentially urged into the tube ends.

Such methods and apparatuses have the disadvantage of assembling a bicycle frame of this type in a time-consuming and labor-intensive manner. Consequently, the frames cannot be constructed in a manner so that the resultant bicycle can be sold at a reasonably competitive price. Accordingly, there is a need for a machine for assembling bicycle frames of the type having lugged brackets and head tubes in which the lugs are forced into the connecting tubes by an interference fit in an efficient and continuous motion. Furthermore, such a machine should have a high rate of output and be designed for the rapid loading and unloading of frame components and finished frames.

SUMMARY OF THE INVENTION

The present invention is an apparatus for the rapid assembly of a bicycle frame of the type having a lugged head tube and lugged connecting brackets in which the components are attached to each other in an interference fit in a continuous and rapid motion. The apparatus includes a bottom bracket clamp, a carriage adapted to clamp the head tube, and a swing arm adapted to engage the seat post bracket. The seat post bracket clamp is mounted on a swing arm which pivots about the bottom bracket clamp, and the carriage supporting the head tube is displaceable in a direction toward and away from the bottom bracket clamp.

The head tube carriage, swing arm and seat post bracket clamp are each displaceable by hydraulic cylinder motors, Once the partially assembled frame is mounted on the apparatus so that the bottom bracket is properly clamped, the carriage is urged toward the bottom bracket and, simultaneously, the swing arm is pivoted toward the carriage and the seat post bracket clamp urges the seat post bracket toward the bottom bracket. The result of this simultaneous movement is that the head tube is urged toward the bottom bracket and the seat post bracket, and the seat post bracket is urged toward the bottom bracket and head tube. This simultaneous movement compensates for the changing angular relationships during such a process so that the lugs are properly driven into the tube ends and rejects due to misalignment of components or binding of lugs within tubes is minimized.

In the preferred embodiment, the apparatus includes a computer control which is connected to pressure sensors and limit switches incorporated into the aforementioned cylinder motors. The cylinder motors are connected to a source of pressurized hydraulic fluid and are adjusted so that the rates of movement of the components of the apparatus by these motors varies with the resistance encountered by the motors, so that the carriage, swing arm and seat post bracket clamp do not move at the same speed throughout the assembly process, but rather move at a speed which is appropriate for that particular segment of the process. This further enhances the efficiency and repeatability of the process performed by the apparatus of the present invention.

Also in the preferred embodiment, the carriage includes a pair of opposing cylinder motors, each having a rod fitted with a plug adapted to engage the upper and lower open ends of a head tube, so that the head tube is retained on the carriage solely by engagement with the plugs. This feature enables the apparatus to adapt to receive head tubes of varying sizes and provides for the rapid engagement and disengagement from a head tube to accelerate the speed at which a frame can be assembled and removed from the apparatus. Similarly, the bottom bracket clamp includes a cylinder motor-actuated clamping shoe which engages the inside surface of the bottom bracket. The computer control actuates both sets of clamping cylinders, so that the cylinders can be positioned for the release of the completed frame at the end of the process.

Accordingly, it is an object of the present invention to provide an apparatus for the assembly of a bicycle frame which assembles frames in a rapid manner with a minimum of rejects; an apparatus which assembles bicycle frames of the type in which lug components are press-fitted into connecting tubes; an apparatus in which bicycle frames are assembled by a continuous rather than an iterative process; and an apparatus which assembles bicycle frames in which the frames may be loaded onto the apparatus, and the assembled frames may be removed from the apparatus rapidly.

Other objects and advantages will be apparent from the following description, the accompanying drawings, and the appended claims.

BRIEF DESCRIPTION OF THE DRAWINGS

FIG. 3 is a detail end elevation in section of the apparatus taken at line 3—3 of FIG. 1;

FIG. 4 is a detail of the apparatus of FIG. 1 showing an exploded, perspective view of the swing arm and a portion of a partially assembled bicycle frame;

FIG. 5 is a side elevation in section of the swing arm shown in FIG. 4, taken at line 5—5 of FIG. 1;

FIG. 6 is a detail of the apparatus of FIG. 1 showing a side elevation in section of the swing arm and base, taken immediately in front of the transfer block on the swing arm;

DETAILED DESCRIPTION OF THE PREFERRED EMBODIMENT

Figure 1:
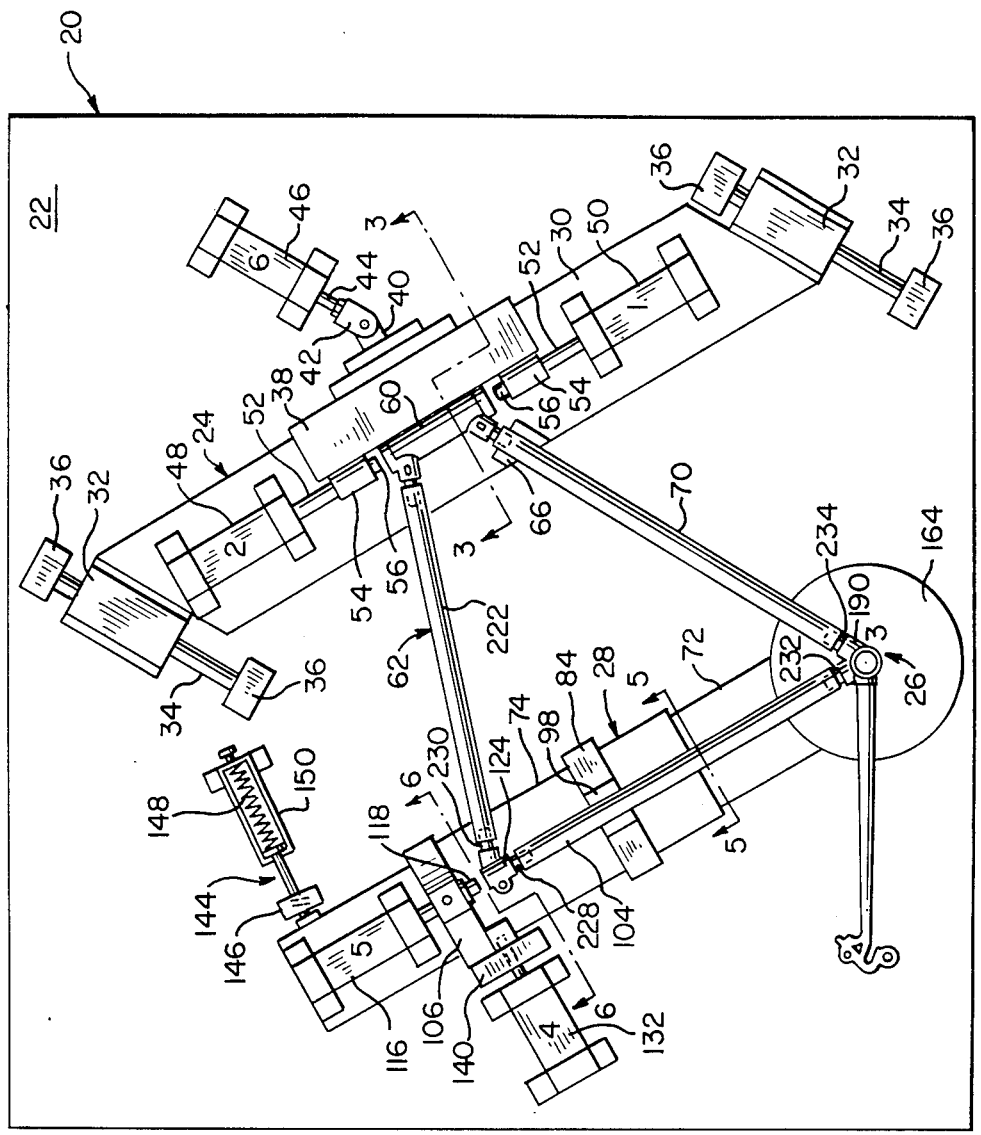
FIG. 1 is a somewhat schematic, top plan view of the apparatus of the present invention with an unassembled bicycle frame positioned thereon.

As shown in FIG. 1, the apparatus for assembling a bicycle frame, generally designated 20, includes a base 22 on which is mounted a carriage assembly 24, a bottom bracket clamping assembly 26, and a swing arm assembly 28. The base 22 preferably is made of a flat plate of metal, such as aluminum, and includes a frame (not shown) which supports it and orients the base at an angle to the horizontal. It is within the scope of this invention to provide a base 22 which comprises a network of webs and struts, rather than a continuous plate, for purposes of reducing the overall weight of the base.

Figure 2:
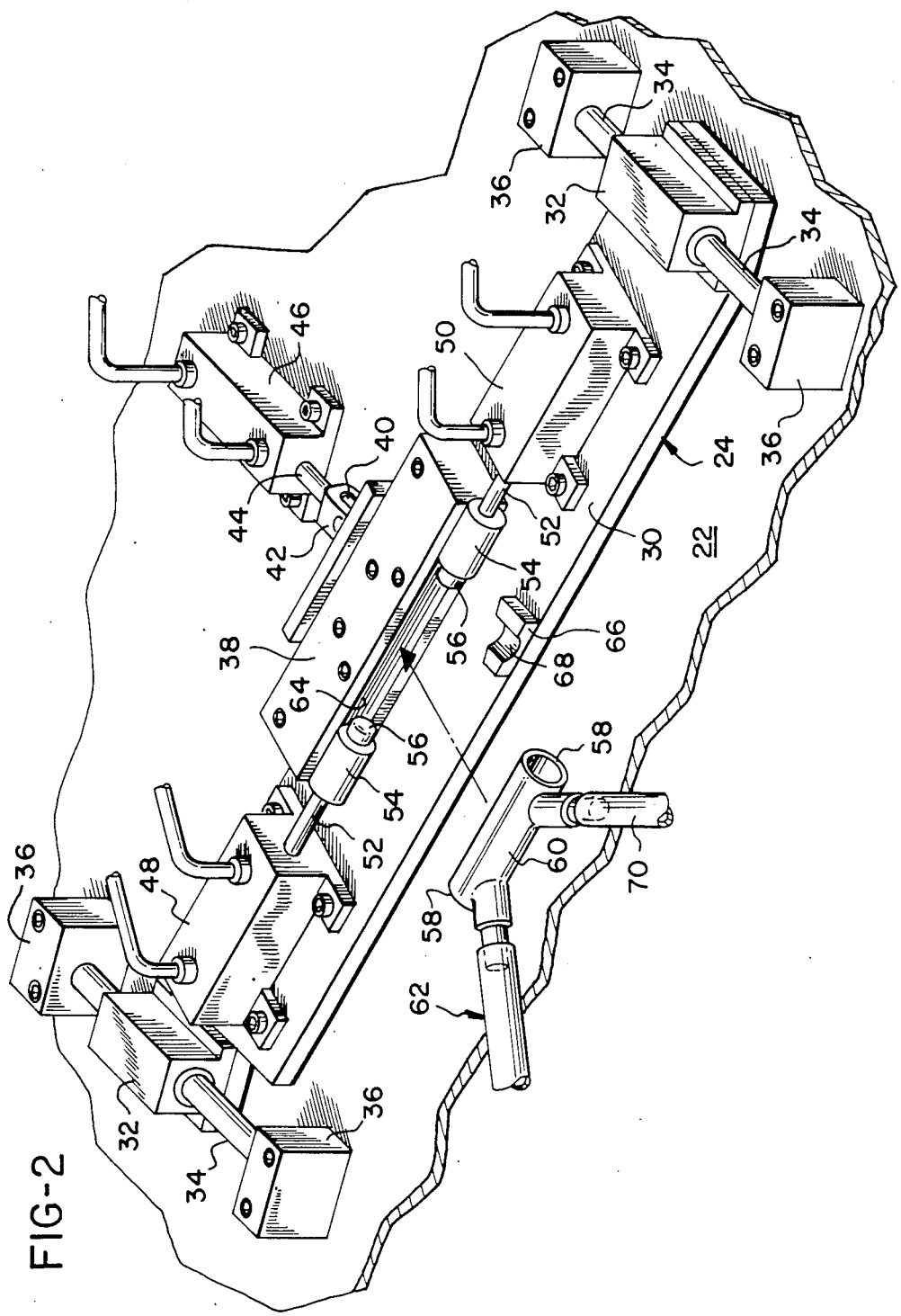
FIG. 2 is a detail perspective view of the head tube carriage of the apparatus of FIG. 1, and in which a head tube is shown removed from the carriage.

As shown in FIGS. 1, 2 and 3, the carriage assembly 24 includes a carriage 30 which is plate-shaped and supported at its ends by slide bearings 32. The slide bearings receive rods 34 which are supported by blocks 36 mounted on the base 22. The rods 34 are oriented such that movement of the bearings 32 along the rods causes the carriage 30 to move toward or away from the bottom bracket assembly 26.

A thrust block 38 is mounted on the upper surface of the carriage 30 and includes knuckle 40 which is pivotally attached to a clevis 42 of the rod 44 of a carriage-displacing cylinder motor 46, which is mounted on base 22.

Upper and lower cylinder motors 48, 50, respectively, are mounted on the carriage 30 on either side of the thrust block 38. Each of the cylinder motors 48, 50 includes a rod 52 having a plug 54 attached to its end which includes a boss 56 shaped to engage the open end 58 of a head tube 60 of a bicycle frame, generally designated 62. The thrust block 38 includes a longitudinal, arcuate groove 64 which is shaped and positioned to slidably receive a portion of the plugs 54, so that the thrust block may act to transmit forces from the cylinder motor 46 directly to the plugs 54 holding the head tube 60. The outside diameters of the plugs 54 exceed the outside diameter of the head tube 60, so that only the plugs 54 engage the slot 64. A guide block 66 is mounted on the upper surface of the carriage 30 and includes a slot 68 which is shaped and positioned to support a down tube 70 of the bicycle frame 62.

Figure 9:
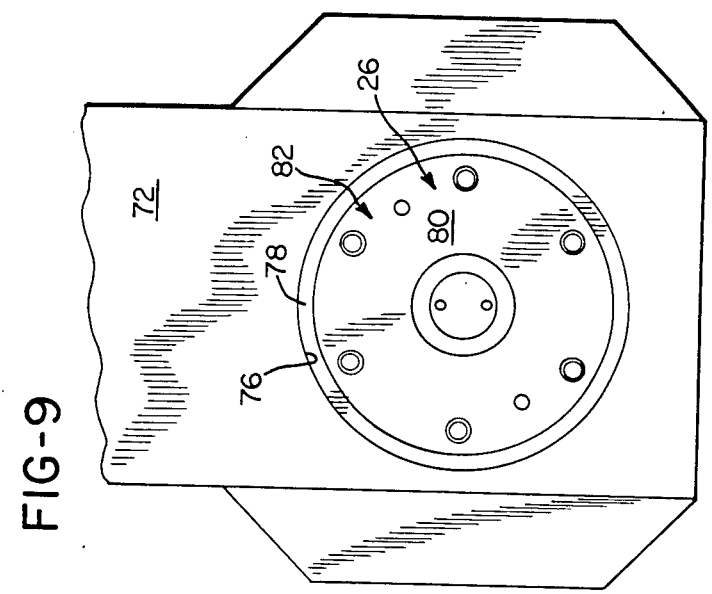
FIG. 9 is a detail of the apparatus of FIG. 1 showing a top plan view of the swing arm and bottom bracket with the cover plate removed.

As shown in FIGS. 1 and 4, the swing arm assembly 28 includes a flat, plate-shaped swing arm 72 on which is mounted a rectangular slide plate 74. As shown in FIG. 9, the swing arm 72 includes a circular opening 76 which receives a bearing ring 78 and is sized to slidably receive the base 80 of the bottom bracket clamp 82.

As shown in FIGS. 4 and 5, the slide plate 74 supports a swing arm cradle 84 for slidable movement toward and away from the bottom bracket assembly 26. The swing arm cradle 84 includes a top panel 86, a pair of side blocks 88 attached to its ends, and a pair of bottom plates 90 attached to the undersides of the side blocks. The top panel 86, side blocks 88 and bottom plates 90 are held together by machine screws 92 and form a pair of opposing channels 94 which are sized to receive the rounded longitudinal edges 96 of the slide plate 74. A support block 98 is attached to the upper surface of the top panel 86 by machine screws 100, and includes a concavity 102 shaped and positioned to cradle the seat mast 104 of the bicycle frame 62.

As shown in FIGS. 4 and 6, the swing arm assembly 28 includes a transfer block 106 having channels 108 formed in its ends and shaped to receive bushings 110. Bushings 110 are shaped to rest upon the rounded ends 96 of the slide plate, so that the transfer block is displaceable therealong. The transfer block 106 includes a central bore 112, which is sized to receive the rod 114 of a hydraulic cylinder motor 116.

The rod 114 is threaded at its end and receives a plug 118 having a boss 120 sized to fit into the open end 122 of a seat post bracket 124 of the bicycle frame 62.

An upper bore 126 is formed in the top of the transfer block 106 and receives an allen screw 126 so that the transfer block can be releasably attached to the cylinder rod 114. When locked to the transfer block 106, displacement of the piston rod 114 causes a similar displacement of the transfer block.

The upper surface of the transfer block 106 includes a pair of inclined faces 128, 130. A cylinder motor 132 is mounted on the base 22 adjacent to the swing arm 72 and includes a rod 134 having an angled head attached to its end. The head 136 includes an inclined face 138 which is sloped similarly to inclined face 128 of the transfer block. A retaining block 140 is mounted on the base 22 and includes a central opening 142 through which the rod 134 extends. Displacement of the rod 134 out of the cylinder 132 causes the surface 138 of the head 136 to bear against the face 128 of the transfer block 106, causing the swing arm to be pivoted toward the carriage assembly 24. The engagement of the inclined faces 138, 128 at the same time urges the transfer block 106 and swing arm 72 downwardly.

As shown in FIG. 1, a return spring assembly 144 includes a rod 146 which urges against a longitudinal edge of the swing arm 72 and an extension spring 148 retained within a cylindrical housing 150. The rod 146 of the spring return 144 urges the spring arm 72 away from the carriage assembly 24 when the rod 134 of cylinder motor 132 is retracted.

As shown in FGIS. 4, 7 and 9, the bottom bracket assembly 26 includes a bottom bracket 82 having a base flange 80 which is mounted on the base 22. The clamp 82 includes an upwardly-extending, cylindrical post 152 having a central bore 154 which communicates with an opening 156 in the base. The post 152 includes a sidewardly opening slot 158 and a stepped portion 160 which extends through the opening 162 in a circular cover plate 164. Cover plate 164 is attached to the flange 80 by machine screws 166 and acts to keep contaminants out of the bearing ring 78 which separates the flange 80 from the swing arm 72.

An arm 168 extends through the bore 154 of the post 152 and includes an elongate slot 170, which is skewed relative to a central axis of the post and arm. A shoe 172 is positioned in the side slot 158 of the post 152 and includes a central channel 174 through which the arm 168 extends. A pin 176 extends through the shoe 172 and slot 170.

The lower portion of the arm 168 includes a knob 178 which is received within complimentary recess 180 formed in a plug 182. The plug 182 is threaded onto the end of a rod 184 of cylinder motor 186 (FIG. 4) which is mounted beneath the base 22. The cylinder motor 186 is mounted such that the rod 184 extends through the opening 156 in the base.

Figure 8:
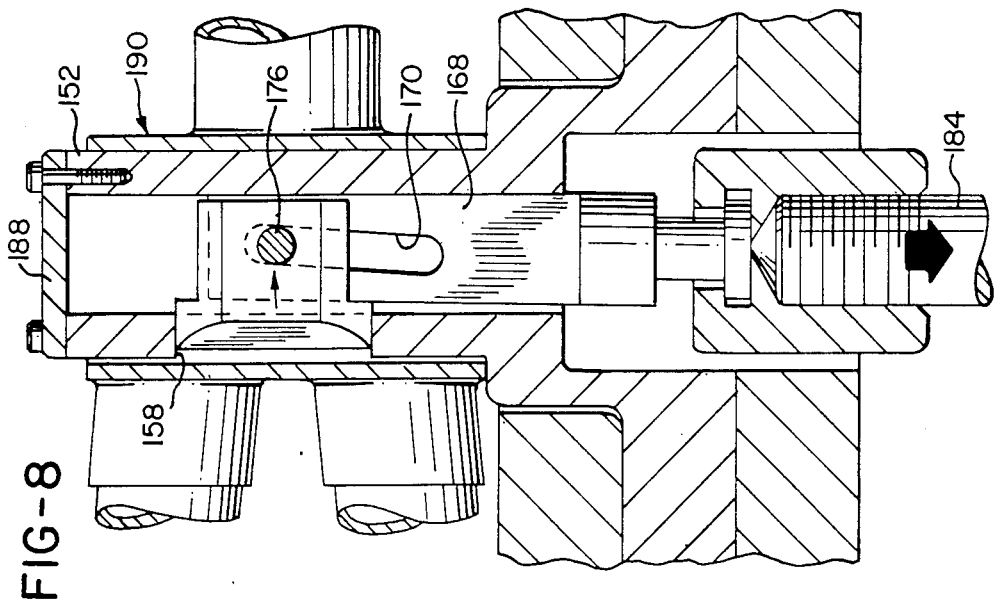
FIG. 8 is a detail side elevation of the clamp shown in FIG. 7 in which the clamping shoe is shown displaced inwardly to release the bottom bracket.

A downward displacement of the rod 184, as shown in FIG. 8, causes a similar downward displacement of the arm 168, which causes the slot 170 to move relative to the pin 176. The skewed orientation of the slot causes the pin, and the shoe 172 to which the pin is attached, to be displaced to the right, as shown in FIG. 8. This causes the shoe 172 to be withdrawn within the side slot 158.

Figure 10:
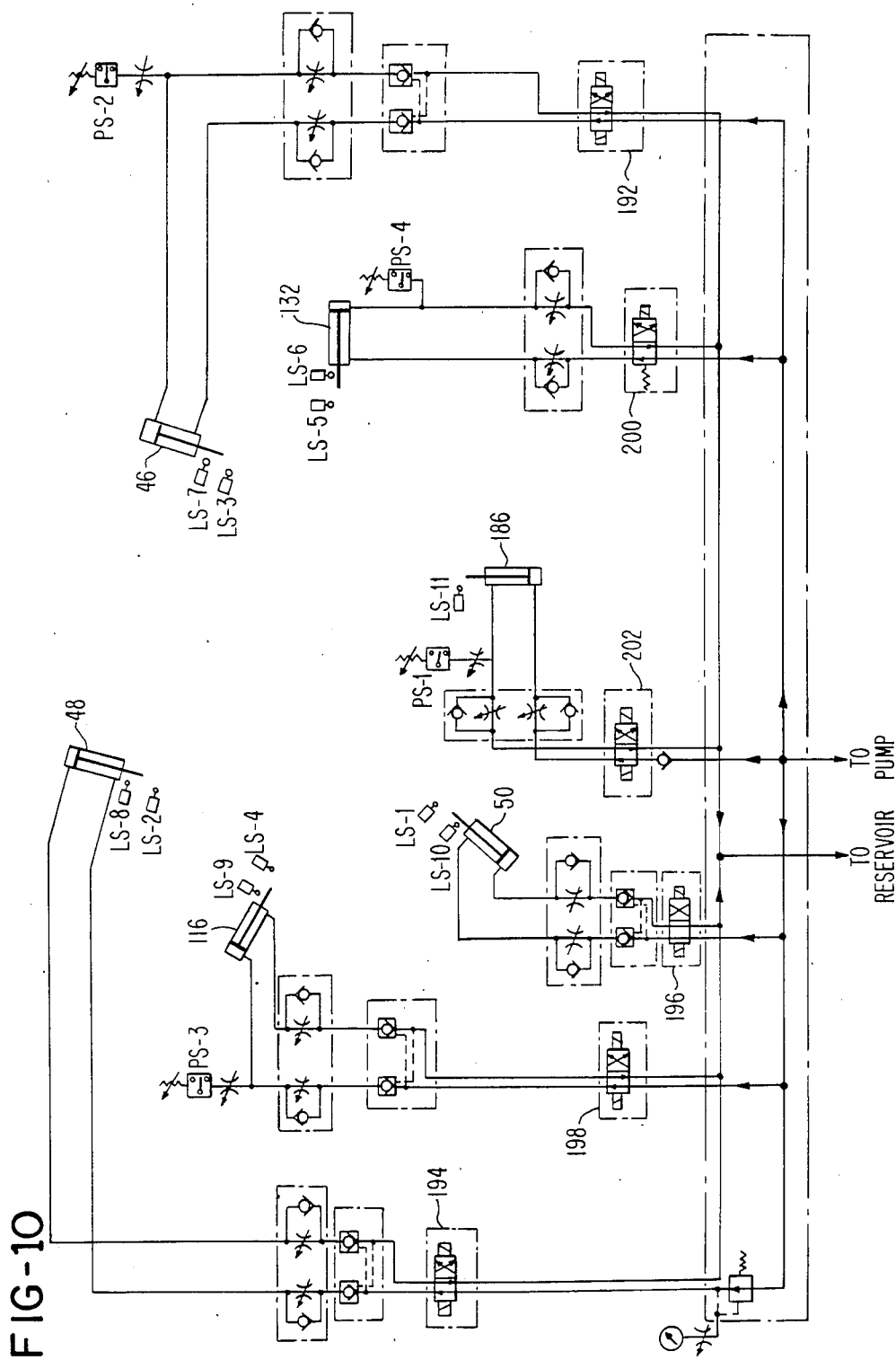
FIG. 10 is a schematic representation of the hydraulic system of the apparatus shown in FIG. 1.

The upper end of the post 152 is sealed by a cap 188. The outer diameter of the post 152 is sized to receive a bottom bracket 190 of the bicycle frame 62 in a loose or slip fit. Upward displacement of the rod 184 causes the arm 168 to be displaced upwardly, and the movement of the slot 170 relative to the pin 176 causes the show 172 to be displaced outwardly from the post 152, thereby locking the bottom bracket 190 onto the post. As shown in FIG. 10, the cylinders 46, 48, 50, 116, 132, and 186 all are part of a hydraulic system which is supplied by a single pump and reservoir (not shown). The upper and lower head tube cylinder motors 48, 50 include advance limit switches LS 2 and LS 1, respectively, which are set to stop the advance of the plugs 54 to accommodate the specific size of the head tube 60.

Cylinder motors 46, 116, and 132 include advance limit switches LS 3, LS 4, and LS 5, respectively, and in addition include pressure switches PS 2, PS 3, and PS 4. Since, as will be explained, the bicycle frame 62 is to be assembled initially by providing an interference fit between its components, the pressure switches are required to ensure that the cylinder motors controlling the movement of the carriage 24, swing arm 28 and transfer block 106 develop sufficient compressive forces to effect a proper press fit. The limit switches act in series with the pressure switches to prevent the over extension of a component. Similarly, the bottom bracket cylinder 186 includes limit switch LS 11 and pressure switch PS 1 which are adjusted to ensure that the bottom bracket 190 is securely held on the bottom bracket clamp 82, but that it is not deformed by over extension of the shoe 172.

Figure 11A:
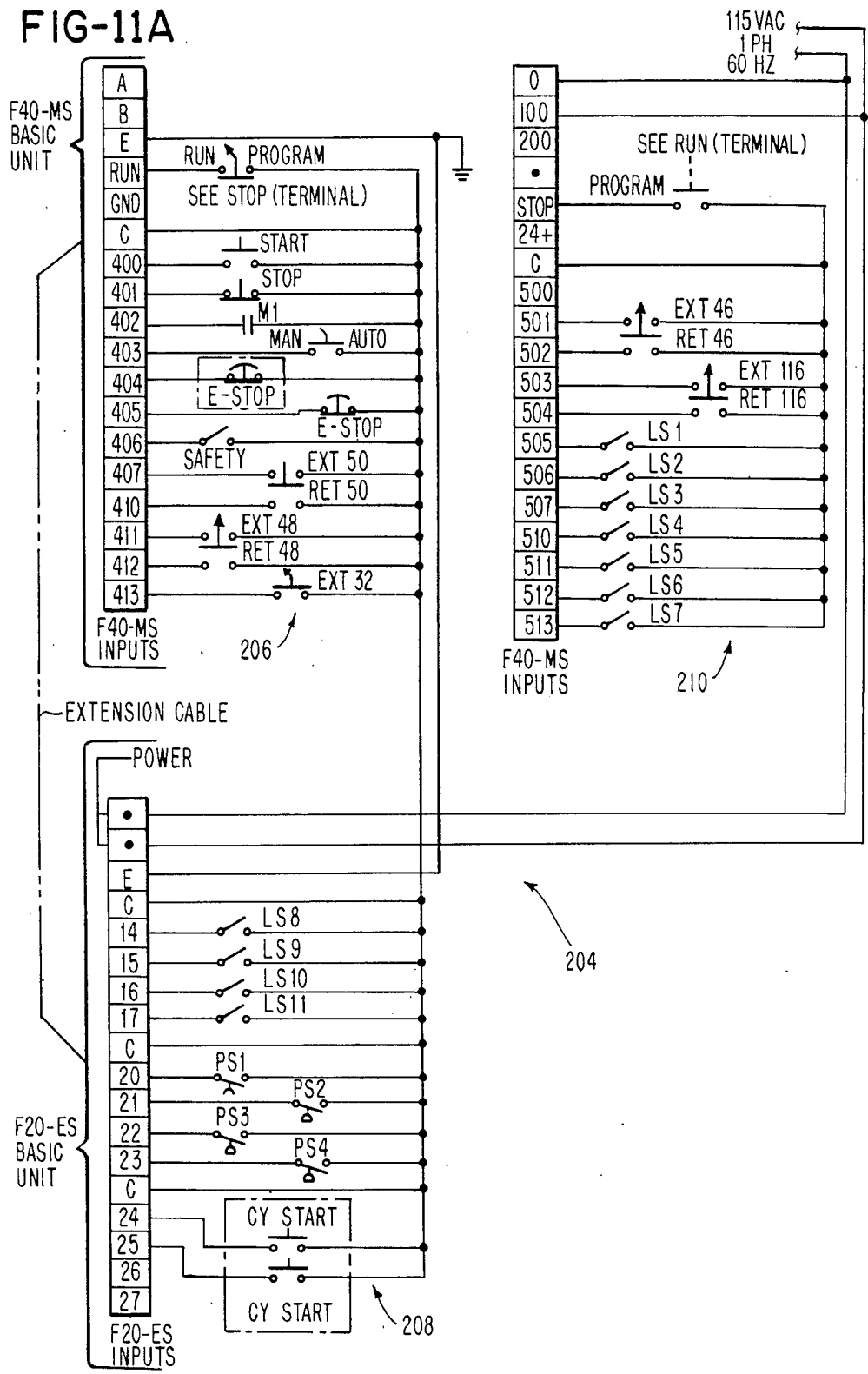
FIGS. 11A and 11B are a schematic representation of the computer control system of the apparatus shown in FIG. 1.
Figure 11B:
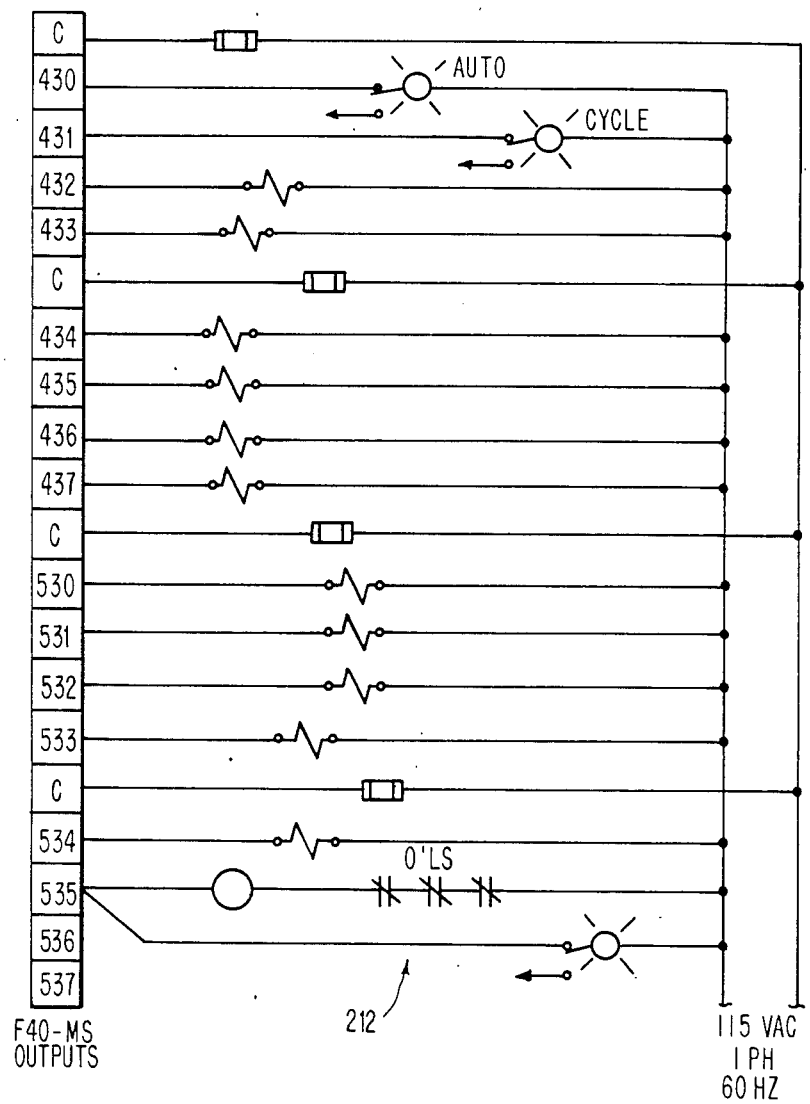

Each of the cylinders 46, 48, 50, 116, 132, and 186 is controlled by a separate double-acting solenoid valve 194–202 which is actuated by a computer, generally designated 204, shown schematically in FIG. 11. The computer 204 is a single board computer and, in the preferred embodiment, comprises a Melsec F-40M computer, manufactured by Mitsubishi Electric, of New York, N.Y. Panels 206, 208, and 210 show the hook-up diagrams for the inputs to the computer 204, and panel 212 shows the outputs. Thus, the computer 204 receives input signals from the limit switches and pressure switches shown in FIG. 10, and actuates the solenoids of the valves 192–202, as shown in panel 212. In addition, the computer is capable of operating in a manual mode and is programmed to allow manual positioning of the cylinder motors 46–186.

Figure 12:
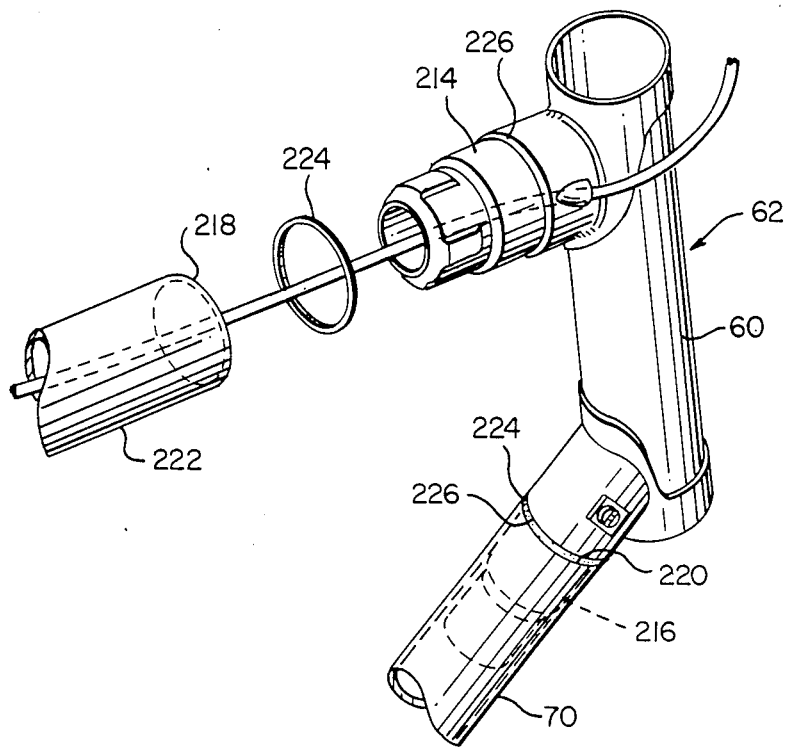
FIG. 12 is a detail perspective view of the head tube of the bicycle frame shown in FIG. 1 in which the top tube has been exploded away from the head tube.

The operation of the computer 204 to actuate the cylinder motors to assemble the bicycle frame 62 will be explained with reference to FIGS. 1 and 13–18. With the preferred embodiment of the apparatus 20 shown in these figures, a preferred type of bicycle frame 62 is shown in detail in FIG. 12. The head tube 60 includes upper and lower lugs 214, 216, which are sized to fit within the ends 218, 220 of the top tube 222 and down tube 70 to provide an interference fit. Trim rings 224 are provided and are sized to rest upon an annular base 226 formed on each lug 214, 216.

When the tubes 222, 70 have been press fitted onto lugs 214, 216, the trim rings 226 provide a smooth joint and compensate for slight out-of-tolerance conditions. The bicycle frame 62 shown in the figures is shown and described more fully in copending application Ser. No. 677,707, filed Dec. 4, 1984 and commonly assigned, the disclosure of which is incorporated herein by reference.

While the frame 62 has been described with reference to head tube 60, it is to be understood that seat post bracket 124 and bottom bracket 190 include pairs of lugs 228, 230, 232, 234, respectively, of a design similar to that for lugs 214, 216, and are fitted into the open ends of the tubes 70, 104, and 122.

Figure 7:
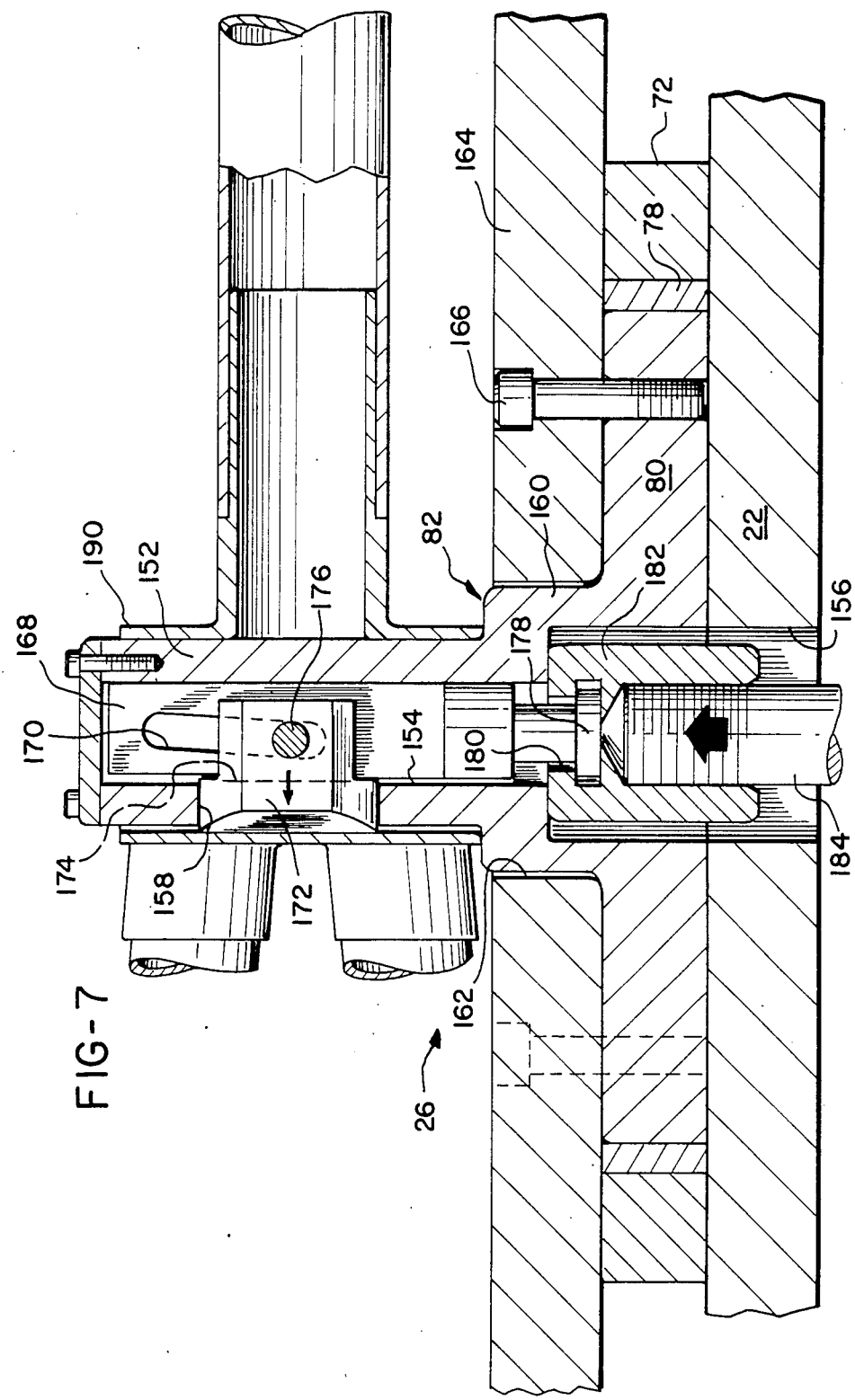
FIG. 7 is a detail of the apparatus of FIG. 1 showing a side elevation in section of the bottom bracket clamp and a partially broken away detail of a bottom bracket mounted thereon.

The apparatus 20 is positioned as shown in FIG. 1 at the start of the assembly process. The frame 62 has been partially assembled as shown in FIG. 1 such that the lugs of the head tube 60, seat post bracket 124, and bottom bracket 190 have been placed loosely within the open ends of the connecting tubes 70, 104, and 222. The frame 62 in this configuration is placed on the apparatus 20 so that the post 152 of the bottom bracket clamp 82 (FIG. 7) extends through the opening in the bottom bracket 190. The plugs 54 of the cylinder motors, 48, 50 have been drawn away from the head tube 60 to allow it to be positioned between them. Similarly, plug 118 has been drawn away from seat post bracket 124 to allow it to be placed properly on the swing arm assembly 28.

The sequence of operation is initiated by the operator, who actuates the computer 204 (FIG. 11) to lock the bottom bracket 190 to the post 152 by actuating the cylinder motor 186 in the manner previously described.

Figure 13:
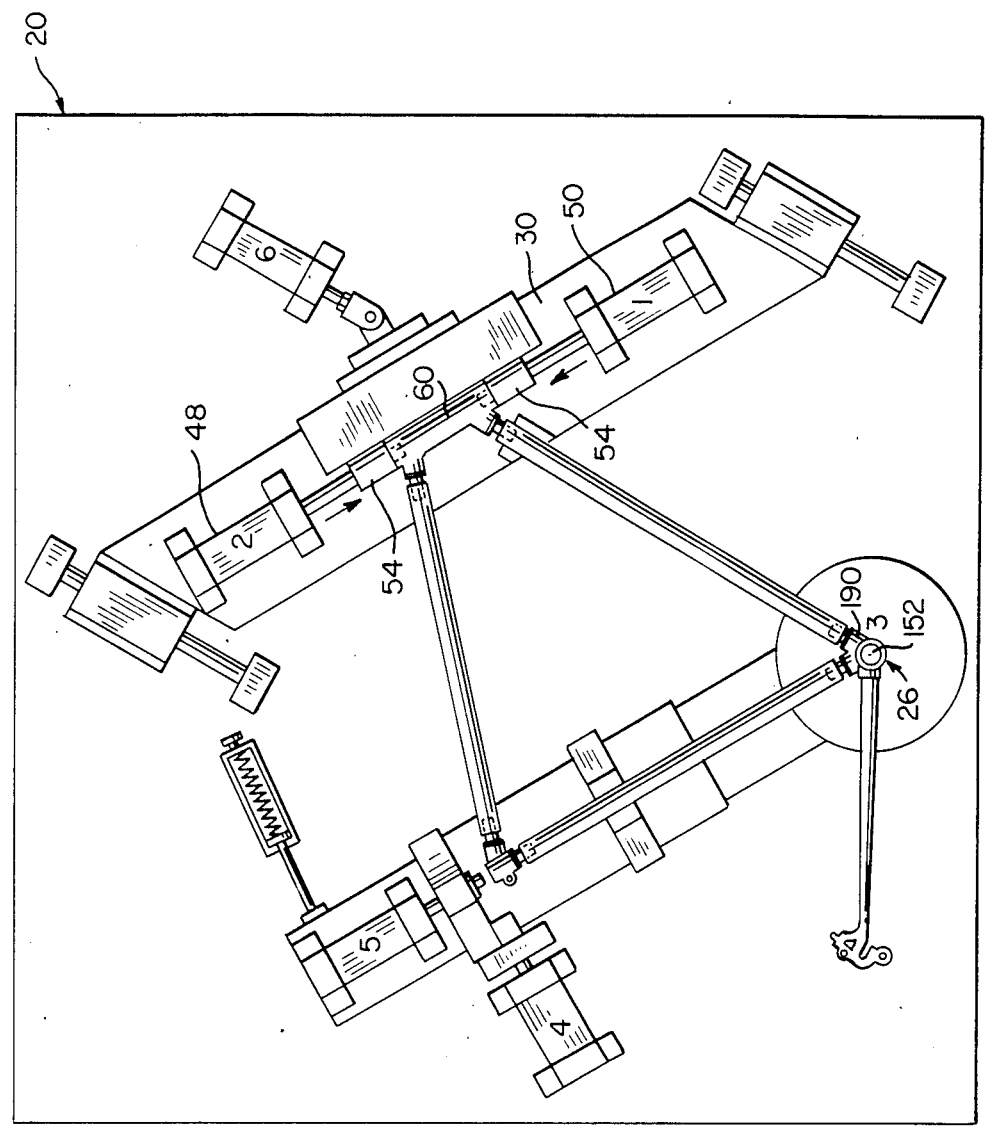
FIGS. 13-18 are schematic, top plan views of the apparatus shown in FIG. 1 in which the components of the apparatus are moved to show the sequence of operations in the assembly of a bicycle frame.

As shown in FIG. 13, in the next step of the process the head tube 60 is clamped to the carriage 30 by cylinder motors 48, 50. The computer 204 actuates cylinder motor 50 to displace its plug 54 into the lower end of the head tube 60, then upper head tube cylinder displaces its plug 54 into the upper head tube opening. The head tube 60 is thereby locked between the plugs 54. Limit switches LS 1 and LS 2 (FIG. 10) determine the point at which plugs 54 stop to engage the head tube 60.

Figure 14:
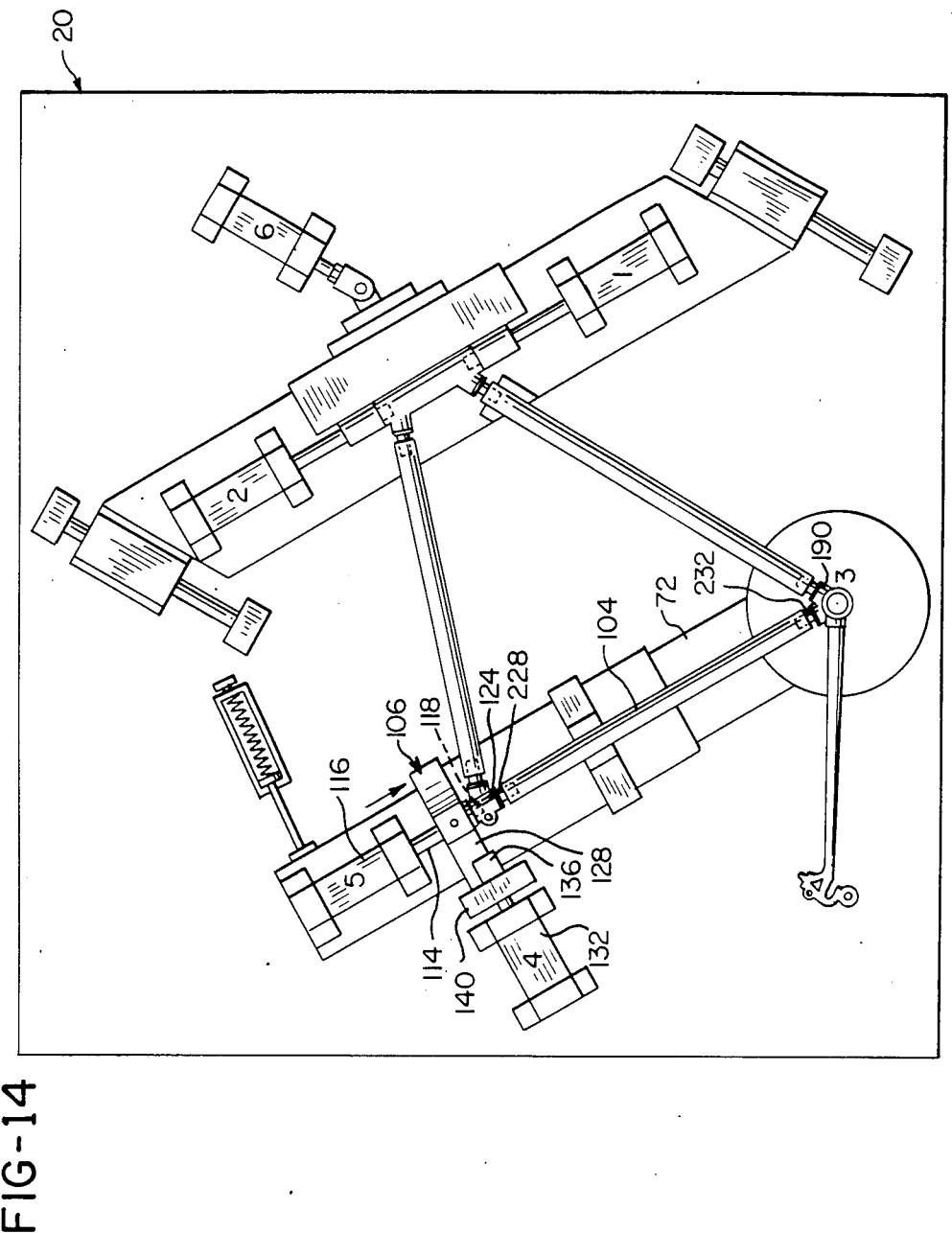

The next step of the process is shown in FIG. 14. Cylinder motor 116 is actuated by the computer to extend rod 114 and thereby displace transfer block 106 radially along switch arm 72 toward bottom bracket 190. This causes plug 118 to engage seat post bracket 124 and begin driving the stub 232 into the seat mast 104. This also brings the inclined face 128 into registry with the head 136 of cylinder motor 132.

Figure 15:
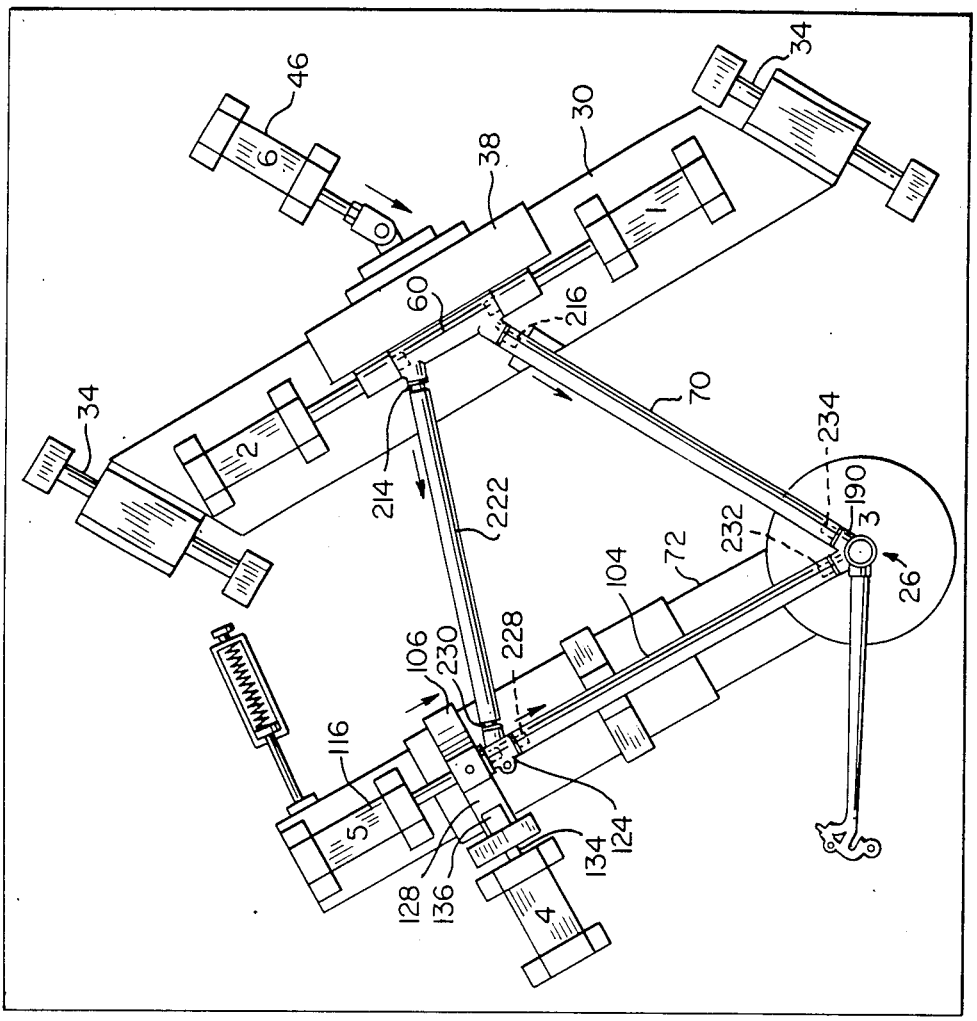

When sufficient compressive pressure has been exerted by cylinder motor 116, pressure switch PS 3 signals the computer to actuate the cylinder motor 46, as shown in FIG. 15. Cylinder motor 46 acts against thrust block 38 to begin to displace the carriage 30 toward the bottom bracket assembly 26, thereby driving stubs 216, 234 into the ends of the down tube 70 in a press fit. At the same time, the carriage 30 is also moving toward seat post bracket 124 so that stubs 214, 230 are being driven into the ends of top tube 222.

During this step of the process, the cylinder motor 116 on the swing arm 72 continues to urge the transfer block along the swing arm toward the bottom bracket assembly 26, thereby continuing to drive the stubs 228, 232 into the ends of the seat mast 104. At this time, the head 136 at the end of rod 134 engages the inclined face 128 of the transfer block 106 so that the seat post bracket 124 is not urged away from the carriage 30 in response to the displacement of the carriage toward the swing arm 72.

The flow of hydraulic fluid to the cylinder motor 64 is greater than the flow of fluid to cylinder 116, so that the carriage 30 moves at a faster rate than the transfer block 106. However, as the carriage 30 meets a higher resistance to movement, which results from the simultaneous movement of stubs 214, 216 into the tubes 222, 70, the rate decreases until it approximately matches that of the transfer block 106.

Since the angular relationships of the connecting tubes 70, 104, 222 change as the connecting components 60, 124, 190 are urged closer to each other, it is necessary that the initial rate of displacement of the carriage 30 along the rods 34 be greater than the rate of displacement of the transfer block 106.

Figure 16:
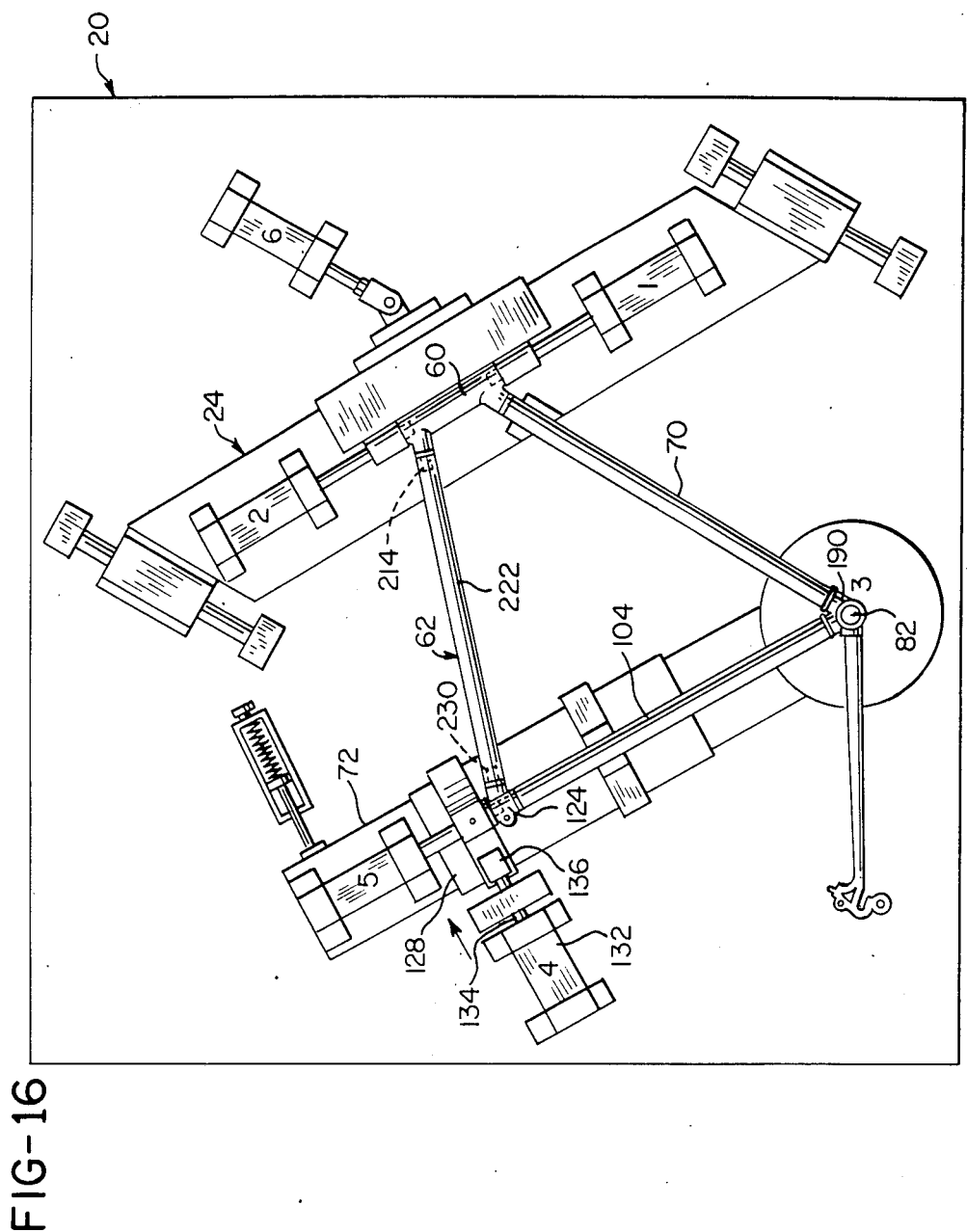

The final step in the assembly process is shown in FIG. 16. When the compressive forces exerted by cylinders 46 and 116 reach a predetermined limit, the computer cycles cylinder motor 132 which extends rod 134 to cause the head 136 to bear against the surface 128 and urge the swing arm 72 to pivot about the bottom bracket clamp 82 toward the carriage assembly 24. This causes the lugs 214, 230 of the head tube 60 and seat post bracket 124, respectively, into the open ends of the top tube 222 to complete the interference connection between those components. The interference connections between the head tube 60 and down tubes 70, and between the bottom bracket 190 and down tube 70 and seat mast 104 have already been completed at the end of the previous step illustrated in FIG. 15. The assembly process steps have now been completed and the computer begins to actuate the cylinders to disengage the frame from the assembly apparatus 20.

Figure 17:
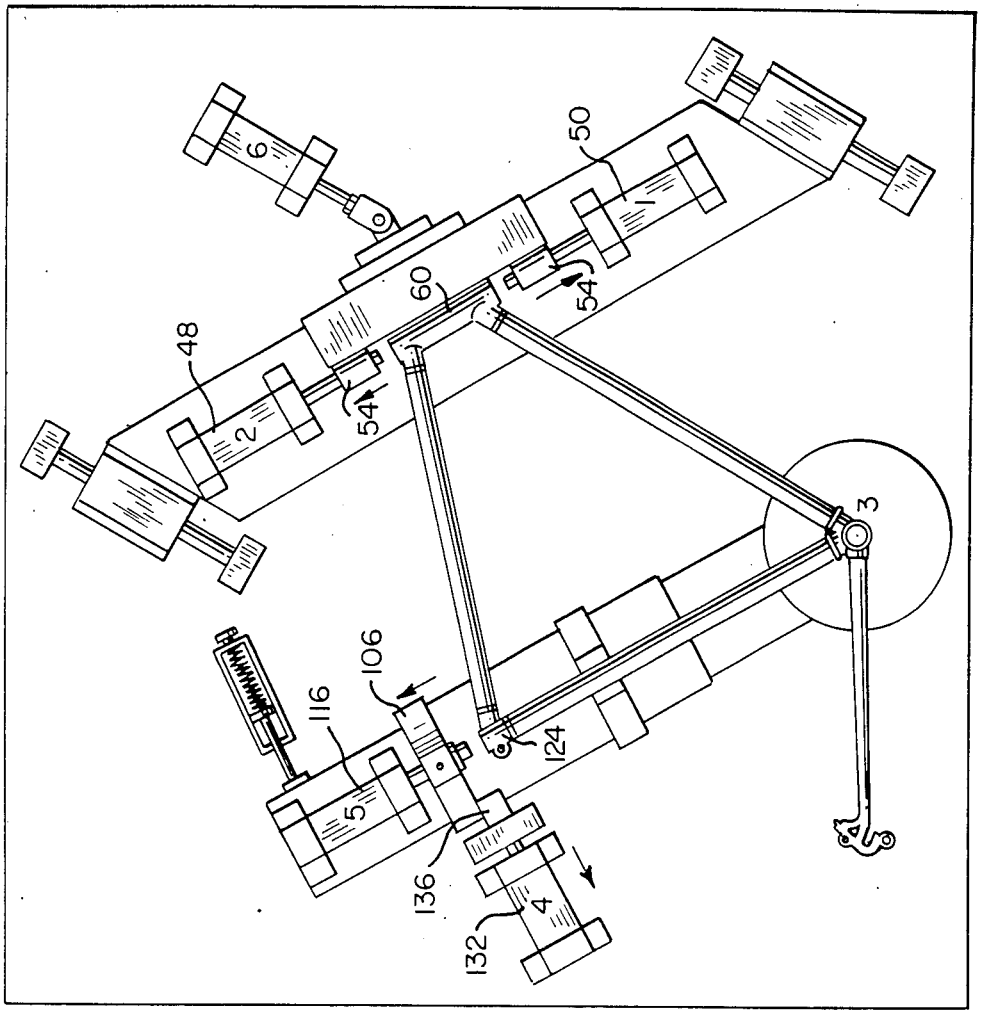

As shown in FIG. 17, this disengagement process begins with the retraction of the transfer block 106 from the seat post bracket 124, and the retraction of the plugs 54 from the head tube 60, by actuation of cylinder motors 116, 48, 50.

Figure 18:
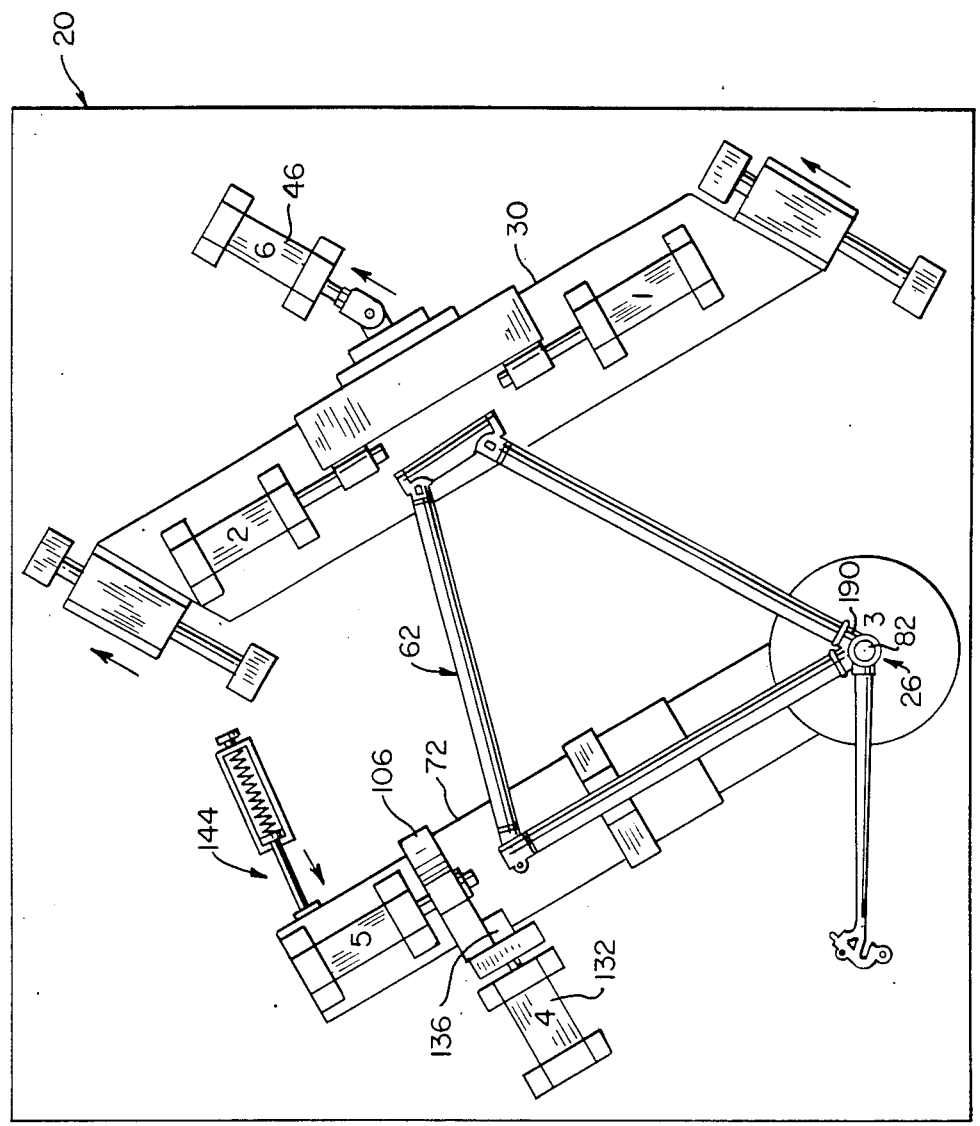

The final steps of disengagement are shown in FIG. 18 and are effected by the retraction of the carriage 30 from the bottom bracket assembly 26, and the retraction of the head 136 from the transfer block 106, by actuation of cylinder motors 46 and 132. The spring return 144 urges the swing arm 72 away from the carriage 30 by pivoting it about the bottom bracket clamp 82.

The process is completed with the actuation of cylinder 186 to disenage the bottom bracket 190 from the bottom bracket clamp 82. The assembled frame 62, its components now press fitted securely together, may now be removed from the apparatus 20 and stored to allow the adhesive in the joints to set up.

While the form of apparatus herein described constitutes a preferred embodiment of this invention, it is to be understood that the invention is not limited to this precise form of apparatus, and that changes may be made therein without departing from the scope of the invention.

What is claimed is:

1. An apparatus for assembling a bicycle frame comprising:

a substantially flat base;

means for clamping a bottom bracket to said base, said clamping means defining a pivot axis oriented substantially perpendicularly to said base;

swing arm means attached to said base to pivot about said pivot axis;

means movable with said swing arm means for supporting a seat bracket on said swing arm means and displacing said seat bracket assembly along said swing arm means toward said pivot axis;

means mounted on said base for pivoting said swing arm means about said pivot axis;

carriage means displaceably mounted on said base for movement toward and away from said pivot axis and said swing arm;

means mounted on said carriage means for engaging and holding a head tube at a predetermined position on said carriage means; and means mounted on said base for displacing said carriage means toward said pivot axis.

2. The apparatus of claim 1 further comprising control means for actuating said seat bracket displacing means, said pivoting means, said engaging means and said carriage displacing means in a predetermined sequence, whereby a seat bracket assembly, head tube and bottom bracket assembly mounted thereon are pressed into hollow tubes extending therebetween to form a bicycle frame.

3. The apparatus of claim 2 wherein said seat bracket displacing means comprises a first double-acting cylinder motor mounted on said swing arm means and including rod means adapted to engage and urge a seat bracket along said swing arm means toward said pivot axis.

4. The apparatus of claim 3 wherein said seat bracket displacing means includes a transfer block slidably mounted on said swing arm means and attached to said rod means of said first cylinder motor.

5. The apparatus of claim 4 wherein said transfer block includes an inclined side wall; and said pivoting means includes a second double-acting cylinder motor having a rod positioned to engage said side wall, thereby urging said swing arm means sidewardly and preventing said swing arm means from rising from said base.

6. The apparatus of claim 5 wherein said second cylinder motor includes retaining block means slidably receiving said rod thereof.

7. The apparatus of claim 6 wherein said engaging and holding means includes a pair of opposing, double-acting cylinder motors, each of said opposing motors having a rod terminating in a plug adapted to engage an end of a head tube.

8. The apparatus of claim 7 wherein said carriage means includes a thrust block mounted thereon, said thrust block having a longitudinal groove sized to receive and support said plugs for sliding movement therealong.

9. The apparatus of claim 8 wherein said clamping means comprises a flange assembly mounted on said base, said flange assembly including a post extending upwardly from said base and sized to receive a bottom bracket assembly thereon; and means for locking a bottom bracket assembly on said post.

10. The apparatus of claim 9 wherein said shaft includes a longitudinal slot therethrough, said slot being skewed relative to a central axis of said bore; and said shoe includes pin means extending through said slot.

11. The apparatus of claim 8 wherein said locking means includes said post having a longitudinal bore therethrough and on side slot communicating with said bore; an arm slidably positioned within said bore; a shoe positioned within said slot and connected to said arm such that movement of said arm within said bore causes displacement of said shoe within said slot; and a doubleacting clamping cylinder motor connected to said arm and actuated by said control means for displacing said arm within said bore.

* * * * *